United States Patent [19]

Ezawa et al.

[11] Patent Number: 4,978,692
[45] Date of Patent: Dec. 18, 1990

[54] POLYIMIDE FOAM

[75] Inventors: Hiroshi Ezawa; Toshiyuki Nakakura; Takayuki Watanabe; Hiroaki Tsushima, all of Kanagawa, Japan

[73] Assignee: Mitsui Toatsu Chemicals, Inc., Tokyo, Japan

[21] Appl. No.: 520,444

[22] Filed: May 8, 1990

Related U.S. Application Data

[62] Division of Ser. No. 454,061, Dec. 19, 1989, Pat. No. 4,943,594.

[30] Foreign Application Priority Data

Dec. 28, 1988 [JP] Japan ................... 63-334660

[51] Int. Cl.$^5$ .................................................. C08J 9/00
[52] U.S. Cl. ....................................... 521/185; 521/79; 521/184; 521/189; 528/185; 528/353
[58] Field of Search ............... 528/185, 353; 521/185, 521/189, 184, 79

[56] References Cited

U.S. PATENT DOCUMENTS

| | | | |
|---|---|---|---|
| 4,696,994 | 9/1987 | Nakajima et al. | 528/185 |
| 4,795,798 | 1/1989 | Tamai et al. | 528/185 |
| 4,847,349 | 7/1989 | Ohta et al. | 528/185 |

*Primary Examiner*—Morton Foelak
*Attorney, Agent, or Firm*—Burns, Doane, Swecker & Mathis

[57] ABSTRACT

Thermoplastic polyimide foams are provided which essentially consist of recurring units represented by the formula (I):

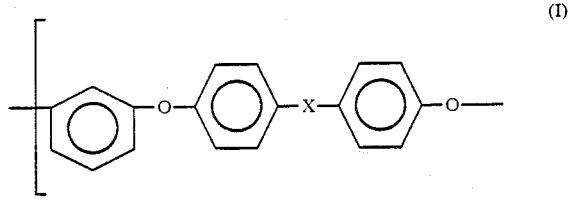

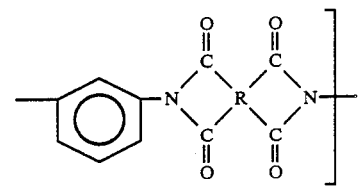

wherein X is a bond, divalent hydrocarbon radical having from 1 to 10 carbon atoms etc. and R is an aliphatic radical having 2 or more carbon atoms, cycloaliphatic radical etc.

The foams have an apparent density of from 0.02 to 0.2 g/cc, average cell diameter of 0.1 to 1 mm and a closed cell content of 50% or more.

5 Claims, No Drawings

POLYIMIDE FOAM

This application is a divisional, of application Ser. No. 454,061, filed Dec. 19, 1989, now U.S. Pat. No. 4,943,594.

BACKGROUND OF THE INVENTION (a) Field of the Invention

The present invention relates to a thermoplastic polyimide foam which is excellent in resistance to heat, flame and abrasion, and also has good fabrication quality.

(b) Description of the Related Art

Foams which have conventionally been developed by use of macromolecular materials are roughly divided into the following two classes.

(1) Foams prepared from thermoplastic resins, for example, polystyrene, polyvinyl chloride, polypropylene and polyethylene.

(2) Foams prepared from thermosetting resins, for example, polyurethane resin, phenol resin, urea resin, melamine resin and imide resin.

The former foams are excellent in abrasion resistance and fabrication quality and hence are broadly applied to automobiles, buildings or electronic and electric fields by utilizing substantial characteristics such as heat insulation property and light-weight property. However, the foams are insufficient in thermal resistance and particularly in flame resistance. For example, shape of the foams are drastically deformed at high temperatures such as above 150° C. and performance of foam is eliminated. When the foams are brought into contact with a flame, combustion occurs from the surface of the foams. Even though flame resistance is provided by addition of a flame retarder, the foams are immediately fused and drip down at the portion contacting the flame. Thus adjacent portions of the foams are successively melted and finally most of the foam disappears. As a result of such disadvantage, the foams cannot be applied to fields such as buildings and aircraft parts where flame resistance is required.

The latter foams which are prepared from thermosetting resin, for example, polyurethane resin foam have also the above disadvantage against flames. On the other hand, the foams prepared from phenol resin, urea resin and melamine resin have excellent flame resistance and do not melt upon contact with flames. However, these foams are poor in abrasion resistance, liable to crack and are impossible to fabricate. These demerits have restricted fields of application.

Polyimide resin foams have also been developed. A representative polyimide foam (A) is based upon a prepolymer of International Harvester Co. which is prepared by esterifying an aromatic carboxylic acid dianhydride with an alcohol and adding a diamine. Another typical polyimide foam (B) is based upon a polyetherimide (ULTEM 1000 ™ etc., products of General Electric Co.) which is prepared from a tetracarboxylic acid dianhydride having ether bonds in the molecule.

The foam (A) has an outstanding thermal resistance and does not deform particularly at a temperature of 200° C. Flame resistance is also excellent because the foam (A) does not melt in contact with the flame. On the other hand, abrasion resistance of the foam (A) is insufficient and fabrication is impossible. Once the foam (A) is made, it cannot be used for various applications by conducting fabrication and hence restriction has been imposed upon the foam (A).

The foam (B) has been improved in flame resistance, abrasion resistance and fabrication quality. However, thermal resistance is still unsatisfactory.

SUMMARY OF THE INVENTION

The object of the present invention is to provide a novel polyimide foam having flame and thermal resistance which are merits of the foam prepared from a thermosetting resin in addition to abrasion resistance and fabrication quality which are merits of the foam prepared from a thermoplastic resin.

The above object of this invention can be achieved by providing a thermoplastic polyimide foam having an apparent density of 0.02 to 0.2 g/cc and essentially consisting of recurring units of the formula (I):

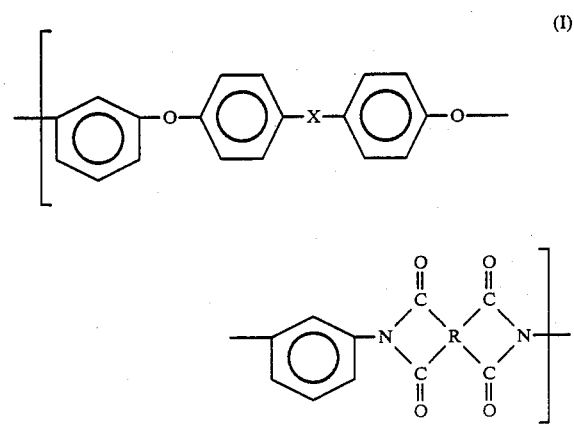

wherein X is a radical selected from the group consisting of a direct bond, divalent hydrocarbon having from 1 to 10 carbon atoms, hexafluorinated isopropylidene, carbonyl, thio, or a sulfonyl, and R is a tetravalent radical selected from the group consisting of an aliphatic radical having two or more carbon atoms, cycloaliphatic radical, monoaromatic radical, condensed polyaromatic radical, and non condensed polyaromatic radical wherein aromatic radicals are mutually connected with a direct bond or a crosslinking function.

The above aliphatic group having two or more carbon atoms, cycloaliphatic radical, monoaromatic radical and condensed polyaromatic radical are preferably

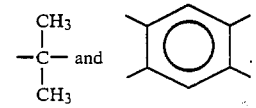

The above non condensed polyaromatic radical is preferably

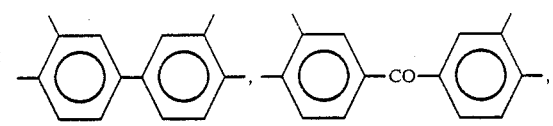

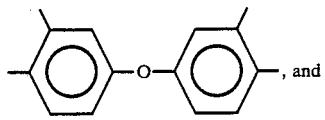, and

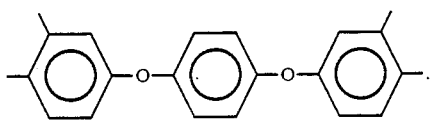.

The above thermoplastic polyimide of the present invention is obtained by reacting an etherdiamine represented by the formula (II):

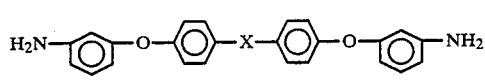 (II)

wherein X is the same as above, with one or more of tetracarboxylic acid dianhydride represented by the formula (III):

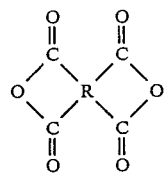 (III)

wherein R is the same as above.

The polyimide is characterized in that a diamine having ether linkages in the molecule is used for a raw material. For example, it can be readily prepared by process such as disclosed in U.S. Pat. No. 4,847,349. Any thermoplastic polyimide described in this patent can be used in the present invention.

Particularly preferred polyimide for use in the production of thermoplastic polyimide of this invention can be prepared by using the following raw materials. That is, the etherdiamine is one or more of compounds selected from 4,4'-bis[4-(3-aminophenoxy)phenyl] sulfide, 4,4'-bis[4-(3-aminophenoxy)phenyl] sulfone, 4,4'-bis(3-aminophenoxy)benzophenone, 4,4'-bis(3-aminophenoxy)biphenyl, 2,2-bis[4-(3-aminophenoxy)phenyl]propane and 2,2-bis[4-(3-aminophenoxy)phenyl]-1,1,1-3,3,3-hexafluoropropane. Preferred tetracarboxylic acid dianhydrides is one or more of compounds selected from pyromellitic dianhydride, 3,3',4,4'-biphenyltetracarboxylic dianhydride, 3,3',4,4'-benzophenonetetracarboxylic dianhydride, 3,3',4,4'-diphenylethertetracarboxylic dianhydride and p-phenyleneoxydi(4-phthalic)dianhydride.

The inherent viscosity of the polyimide is measured at 35° C. in a solution containing 0.5 g of the polyimide in 100 ml of a solvent mixture composed of p-chlorophenol/phenol in a ratio of 90/10 by weight.

The inherent viscosity of the above thermoplastic polyimide which can be employed in this invention is usually from 0.35 to 0.65 dl/g and preferably from 0.40 to 0.60 dl/g. When the inherent viscosity of the thermoplastic polyimide is less than 0.35 dl/g, the thermoforming property decreases and the closed cell content also decreases. On the other hand, an inherent viscosity exceeding 0.65 dl/g reduces extrusion characteristics and cannot maintain economical productivity.

The preferred apparent density of the foam prepared from the above thermoplastic polyimide is in the range of 0.02 to 0.2 g/cc. An apparent density exceeding 0.2 g/cc gives adverse effects on the economical advantage due to weight saving and further impairs several merits such as shock-absorbing properties, heat insulation property and sound insulating characteristics of the foam.

On an other hand, the apparent density less than 0.02 g/cc lowers mechanical strengths of the foam and also leads to an unfavorable decrease in flame resistance, abrasion resistance or fabrication quality.

The apparent density is measured by the following method. A foam sample is weighed. The foam sample is completely submerged into a prescribed volume of water placed in a measuring cylinder and the volume of the foam is measured. Then the apparent density of the foam is calculated by dividing the weight with the volume.

Characteristics of the above polyimide foam having an apparent density of 0.02 to 0.2 g/cc are dependent particularly upon the cell structure. Preferred foam has an average cell diameter of 0.1 to 1 mm, and more preferably has a closed cell content of 50% or more.

The average cell diameter and the closed cell content are calculated by the following methods.

Average Cell Diameter . . . A cross-sectional photograph in a thickness direction of the foam is used. Each 10 cells of large, medium and small sizes are selected and their diameters are measures. Average cell diameter is a mean value of these diameters.

Closed Cell Content . . . A foam sample having prescribed dimensions (40×40 mm) is weighed. The sample is placed under water surface and the pressure is reduced to 400 mm Hg. The foam is allowed to stand in this state for a minute and then is taken out of the water and weighed. The amount of the water (Vw) absorbed into the foam is calculated from the weights of the foam before and after immersion into the water. The closed cell content is calculated by the following formula:

$$\frac{V_F - V_W}{V_F} \times 100$$

wherein $V_F$ is volume of the foam.

The thermoplastic polyimide foam of this invention can be prepared by employing a foaming extruder for use in the processing of conventional thermoplastic resin.

Exemplary foaming agents which can be used in this invention include, for example, (1) sublimate substances having a boiling point exceeding 200° C. such as phthalic anhydride, (2) chemical foaming agents causing decomposition in the vicinity of 200° C. such as trihydrazinotriazine, barium azodicarboxylate and dinitrosopentamethylenetetramine, (3) low boiling point organic compounds such as dichlorotrifluoroethane, monochlorotetrafluoroethane, dichlorofluoromethane, monochlorodifluoromethane and acetone, and (4) hydrates such as oxalic acid dihydrate which dissociates water at a temperature above 200° C. The preferred foaming agent is (1) sublimate substance.

The amount of the foaming agent used is selected on the basis of the desired apparent density of the foam to be obtained. For example, the amount is from 0.025 to 0.3 mole of the sublimable substance per 100 g of the thermoplastic polyimide, from 1 to 10 parts by weight of the chemical foaming agent per 100 parts by weight of the polyimide, from 0.05 to 0.5 mole of the low boiling point organic compound per 100 g of the polyimide, and in the case of the hydrate, from 0.025 to 0.3 mole of dissociated water per 100 g of the polyimide.

The polyimide foam of this invention can be produced through usual foaming processes by adjusting the amount of the foaming agent respectively in the above range.

For example, when the foaming agent is a solid, the agent and the thermoplastic polyimide are simultaneously fed from the hopper of an extruder. The cylinder temperature of the extruder is controlled in the range of 360° to 440° C., and the polyimide and the foaming agent are uniformly kneaded in the cylinder. The temperature of the kneaded mass is gradually decreased as forward movement toward the point of extruder. The temperature of the die is controlled in the range of 250° to 370° C. The kneaded mass is delivered through the die into the atmosphere and expands into the foam. The foam extruded from the die slit can also form a micro cell layer on the surface by cooling with air or a sizing die to a temperature range of 150° to 250° C.

When the foaming agent is liquid, the foaming agent is injected into the melted thermoplastic polyimide in the midway of the extruder and then the foam can be produced by the same procedures as mentioned above.

Additionally, the size of the cells can be controlled by the added amount of inorganic nucleating agents such as talc, silica gel and surface-active agent. In the cases where the foaming agent is the sublimate substance, low boiling point organic compound or the hydrate, the foam having an average cell diameter of 0.1 to 1 mm can be preferably prepared by using the above nucleating agent in an amount from 0.1 to 3 parts by weight per 100 parts by weight of the polyimide. When the foaming agent is the chemical foaming agent, it is preferred to prepare the foam by using from 0.1 to 1 part by weight of the above nucleating agent per 100 parts by weight of the polyimide.

Further, the closed cell content is suitably controlled by the temperature of the kneaded mass in the extruder and cooling conditions after being delivered from the die slit. The closed cell content is preferably maintained at 50% or more.

No particular limitation is imposed upon the combined use of the above foaming agents. Other auxiliary agents such as antistatic agents and colorants may also be added when necessary.

According to the present invention, it is provided the thermoplastic polyimide foam which is excellent in the resistance to heat, flame and abrasion in addition to chemical resistance and thermal insulation and also outstanding in shaping properties and fabrication qualities such as lamination, adhesion, coating and other surface treatments.

EXAMPLE 1

Polyimide powder obtained by reacting 4,4'-bis(3-aminophenoxy)biphenyl with pyromellitic dianhydride and having an inherent viscosity of 0.45 dl/g was extruded at a cylinder temperature of 400° C. and cut into pellets.

The inherent viscosity of the polyimide is measured at 35° C. in a solution containing 0.5 g of the polyimide in 100 ml of a solvent mixture composed of p-chlorophenol/phenol in a ratio of 90/10 by weight.

A mixture containing 0.05 mole of phthalic anhdyride per 100 g of the polyimide pellets and 0.7 part by weight of talc per 100 parts by weight of the polyimide pellets was charged to the hopper of an extruder having a diameter of 30 mm. The cylinder temperature of the extruder was maintained from 380° to 410° C. The mixture was melt-kneaded in the cylinder and the temperature of the kneaded mass was gradually lowered with forward movement toward the point of the extruder. The temperature of a die fixed on the point was controlled to 355° C. A pressure gauge mounted on the inlet of the die indicated resin pressure of 110 kg/cm$^2$. The kneaded mass was delivered from the die into a sizing die jointly with pressure reduction and thus a foam was obtained. The foam had a thickness of 5 mm, width of 100 mm, apparent density of 0.09 g/cc, average cell diameter of 0.5 mm and a closed cell content of 78%.

A specimen having the dimensions of 25 mm×120 mm was cut out of the foam obtained above. The sample was horizontally placed on a pair of supporting points having a span of 100 mm. A load of 100 g was applied on the sample at the center of the span. Under this state, the specimen was allowed to stand in a thermostatic oven at 200° C. for an hour. As a result, almost no deformation was observed and excellent thermal resistance of the foam was exhibited. When a foam specimen having dimensions of 25 mm×120 mm was held horizontally and brought into contact with a flame of burner for period of 10 seconds, neither combustion nor dripping occurred.

On the other hand, taber abrasion test was carried out in accordance with JIS K-7204 by using a specimen die-cut into a disc of 100 mm in diameter. The test was conducted under load of 250 g by using a truck wheel CS 10. Abrasion loss of the specimen after 1000 continuous rotations was 95 mg.

The foam was heated in an atmosphere of 380° C. for a minute and shaped in a figure U type mold having a clearance of 4 mm between male and female molds. A good shape without cracks on the surface could be obtained by setting the mold temperature at 180° C.

EXAMPLE 2

Polyimide powder obtained by reacting bis[4-(3-aminophenoxy)phenyl] sulfide with pyromellitic dianhydride and having an inherent viscosity of 0.46 dl/g was pelletized by the same procedures as carried out in Example 1.

A mixture containing 0.03 mole of phthalic anhydride per 100 g of the polyimide pellets and 0.3 part by weight of talc per 100 parts by weight of the polyimide pellets was extruded by the same procedures as conducted in Example 1. The foam thus obtained had an apparent density of 0.15 g/cc, average cell diameter of 0.8 mm and a closed cell content of 75%.

No deformation was found in the test carried out at 200° C. and excellent thermal resistance was exhibited. No dripping was also observed when the foam specimen was brought into contact with the flame. Loss in Taber abrasion test was 135 mg, which result was excellent. When the foam was laminated with an epoxy base adhesive, sufficient strength of the laminated board could be obtained without destruction of base materials on the interface.

COMPARATIVE EXAMPLE 1

A foam was obtained by carrying out the same procedures as conducted in Example 1 except that 0.1 mole of phthalic anhydride was mixed.

The foam obtained had an apparent density of 0.018 g/cc, average cell diameter of 0.5 mm and a closed cell content of 66%.

Abrasion loss of the foam was a large value corresponding to 2500 mg after 1000 continuous rotations in Taber abrasion test. When the foam was laminated with an epoxy base adhesive, base materials are liable to destruct on the interface and hence sufficient strength of the laminated board could not be obtained.

COMPARATIVE EXAMPLE 2

A foam was extruded by carrying out the same procedures as conducted in Example 1 except that the temperature of the die fixed on the point of the extruder was set at 410° C.

The foam thus obtained had an apparent density of 0.11 g/cc and a closed cell content of 45%. Thermoforming of the foam was carried out by the same procedures as conducted in Example 1. However, the foam was broken at the corner portion of the figure U.

EXAMPLE 3

A mixture containing 100 parts by weight of the polyimide used in Example 1 and 0.7 parts by weight of talc was charged to the hopper of an extruder of 30 mm in diameter. Cylinder temperature of the extruder was set from 380° to 410° C. and the polyimide was melted. Acetone was injected in the midway of the extruder at a proportion of 0.2 mole per 100 g of the polyimide and mixed with the fused polyimide. The temperature of the resulting mixture was gradually decreased with forward movement toward the point of the extruder. The temperature of a die fixed on the point was set at 320° C. The mixture was delivered from the die into a sizing die jointly with pressure reduction.

The foam obtained had a thickness of 5 mm, width of 100 mm, apparent density of 0.05 g/cc, average cell diameter of 0.8 mm and closed cell content of 62%.

No deformation was found at 200° C. in the thermal resistance test illustrated in Example 1. No dripping was observed in the combustion test. Abrasion loss was 537 mg in Taber abrasion test. Heat shaping was carried out by the same procedures as conducted in Example 1, and an acceptable article was obtained good.

COMPARATIVE EXAMPLE 3

A foam was obtained by carrying out the same procedures as conducted in Example 1 except that polyether imide prepared from 2,2-bis[4-(3,4-dicarboxyphenoxy)-phenyl]propane dianhydride and m-phenylenediamine.

The foam obtained had a thickness of 5 mm, width of 100 mm, apparent density of 0.09 g/cc, average cell diameter of 0.5 mm and closed cell content of 85%.

A specimen of 25 mm × 120 mm in dimensions was cut out of the foam and the thermal resistance test was carried out as conducted in Example 1. The specimen sagged at the center of the span.

EXAMPLE 4

A foam was obtained by carrying out the same procedures as conducted in Example 1 except that trihydrazinotriazine was added in place of phthalic anhydride in an amount of 1.8 parts by weight per 100 parts by weight of the polyimide.

The foam obtained had an apparent density of 0.15 g/cc, average cell diameter of 0.3 mm and a closed cell content of 86%.

No deformation was observed in the thermal resistance test illustrated in Example 1. No dripping was found in the combustion test. Abrasion loss was 57 mg in Taber abrasion test. When the foam was laminated with an epoxy base adhesive, the laminated board had a sufficient strength without destruction of the base materials on the interface.

The foam was heated in an atmosphere of 380° C. for a minute and shaped in a figure U type mold having a clearance of 4 mm between male and female molds. A good shape without cracks on the surface could be obtained by setting the mold temperature at 180° C.

What is claimed is:

1. A thermoplastic polyimide foam having an average cell diameter of the foam of from 0.1 to 1.0 μm and a closed cell content of the foam of 50% or more of the cells and an apparent density of from 0.02 to 0.2 g/cc and essentially consisting of recurring units of the formula (I):

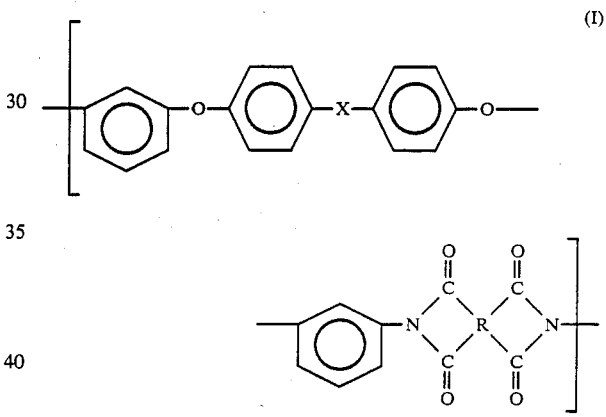

wherein X is a radical selected from the group consisting of a direct bond, divalent hydrocarbon having from 1 to 10 carbon atoms, hexafluorinated isopropylidene, carbonyl, thio, or a sulfonyl, and R is a tetravalent radical selected from the group consisting of an aliphatic radical having two or more carbon atoms, cycloaliphatic radical, monoaromatic radical, condensed polyaromatic radical, and condensed polyaromatic radical wherein aromatic radicals are mutually connected with a direct bond or a crosslinking function.

2. The polyimide foam of claim 1 wherein X is a direct bond or a thio group.

3. The polyimide foam of claim 1 wherein R is a benzene group.

4. The polyimide foam of claim 1 wherein the thermoplastic polyimide is obtained by reacting one or more etherdiamine selected from the group consisting of 4,4'-bis[4-(3-aminophenoxy)phenyl] sulfide, 4,4'-bis[4-(3-aminophenoxy)phenyl] sulfone, 4,4'-bis(3-aminophenoxy)benzophenone, 4,4'-bis(3-aminophenoxy)biphenyl, 2,2-bis[4-(3-aminophenoxy)phenyl]propane and 2,2-bis[4-(3-aminophenoxy)phenyl]-1,1,1-3,3,3-hexafluoropropane, with one or more of tetracarboxylic acid dianhydride selected from the group consisting of pyromellitic dianhydride, 3,3',4,4'-biphenyltetracarboxylic dianhydride, 3,3',4,4'-benzophenonetetracarboxylic dianhydride, 3,3',4,4'-diphenylethertetracarboxylic dianhydride and p-phenyleneoxydi(4-phthalic) dianhydride.

5. The polyimide foam of claim 1 wherein an inherent viscosity of the thermoplastic polyimide measured in a solvent mixture of p-chlorophenol/phenol at a ratio of 90/10 by weight is in the range of from 0.35 to 0.65 dl/g 35° C. in a concentration of 0.5 g/100 ml-solvent.

* * * * *

UNITED STATES PATENT AND TRADEMARK OFFICE
CERTIFICATE OF CORRECTION

PATENT NO. : 4,978,692

DATED : December 18, 1990

INVENTOR(S) : Hiroshi Ezawa et al.

It is certified that error appears in the above-identified patent and that said Letters Patent is hereby corrected as shown below:

Claim 5, column 2, line 3: After "dl/g" insert --at--.

line 4: Delete "in" and insert therefor --at--.

Signed and Sealed this

Twenty-fifth Day of August, 1992

Attest:

DOUGLAS B. COMER

*Attesting Officer*    Acting Commissioner of Patents and Trademarks